United States Patent [19]

Beckett

[11] 4,080,650

[45] Mar. 21, 1978

[54] FACILITATING RETURN FROM AN ON-LINE DEBUGGING PROGRAM TO A TARGET PROGRAM BREAKPOINT

[75] Inventor: Jon Terry Beckett, Naperville, Ill.

[73] Assignee: Bell Telephone Laboratories, Incorporated, Murray Hill, N.J.

[21] Appl. No.: 709,407

[22] Filed: Jul. 28, 1976

[51] Int. Cl.² .......................................... G06F 11/04
[52] U.S. Cl. ................................................... 364/200
[58] Field of Search ........................................ 364/200

[56] References Cited

U.S. PATENT DOCUMENTS

| 3,292,155 | 12/1966 | Neilson | 340/172.5 |
| 3,593,297 | 7/1971 | Kadner | 340/172.5 |
| 3,696,340 | 10/1972 | Matsushita et al. | 340/172.5 |
| 3,909,802 | 9/1975 | Cassarino, Jr. et al. | 340/172.5 |

*Primary Examiner*—Gareth D. Shaw
*Assistant Examiner*—C. T. Bartz
*Attorney, Agent, or Firm*—Daniel E. Nester; James W. Falk

[57] ABSTRACT

A computer system is disclosed in which a single instruction emulates return of computer control to the point of a program trap without requiring removal of the trap from the program.

7 Claims, 5 Drawing Figures

INSTRUCTION XQT

BREAKPOINT TABLE

TARGET PROGRAM

FACILITATING RETURN FROM AN ON-LINE DEBUGGING PROGRAM TO A TARGET PROGRAM BREAKPOINT

BACKGROUND OF THE INVENTION

This invention relates to computer sequence control and data handling apparatus for returning control of a computer from a debugging program to a target program without removing the breakpoint instruction inserted in the target program.

On-line debugging facilities are provided in computer installations to permit a computer user to monitor the flow of a target program and, at strategic points in the target program, to check the contents of the computer memory or registers in the computer. A description of typical debugging concepts and techniques is given in chapter 8 of *Techniques of Program Structure and Design*, Prentice Hall, 1975, by E. Yourdon. A generic term for debugging program packages mentioned in this book is "dynamic debugging technique" or DDT.

A typical DDT monitor provides commands for performing at least the following operations:

1. Interrogate the contents of selected computer registers and memory locations.
2. Modify the contents of selected registers and memory locations.
3. Set "traps" or "brakpoints" in the target program (i.e., the program being debugged) at selected locations in memory, and
4. Branch to any selected location in memory or return to the last breakpoint encountered by the target program.

In general, a DDT monitor is loaded into the computer memory along with the target program or programs to be tested. Execution is started in the DDT monitor resulting in the initialization of computer registers and memory as necessary, the establishment of one or more breakpoints in the target program at selected memory locations, and the transfer of control to the target program.

When a breakpoint is encountered in executing the target program, control is returned to the DDT monitor. Computer registers and memory can then be interrogated and modified and breakpoints can be added to or removed from the target program under control of the user. Control is then transferred from DDT back to the target program — either to the address of the last target program breakpoint encountered or to a new address in the target program.

A common method of inserting breakpoints in a target program has been to replace the contents of a specified memory location in the target program by a single word trap instruction which, when executed, causes a branch or trap into DDT. Both the trapped instruction, i.e, the instruction formerly at the memory location to be trapped, and the address of that location are stored in a breakpoint table in memory. The number of breakpoints which can be inserted in target programs is limited only by the size of the breakpoint table in memory.

Frequently, after a target program breakpoint has been encountered, the user wishes to resume execution of the target program without removing the breakpoint. When returning from DDT to the target program, it is necessary to execute the trapped instruction without immediately causing another trap. This problem has been handled in several ways in existing DDT programs.

In one method, the content of the breakpoint location in the target program is temporarily replaced with the trapped instruction, an interrupt flag is set which will be detected only after execution of the trapped instruction, and the breakpoint is restored to its location in the target program following detection of the interrupt flag. This approach requires a computer architecture which will permit deferral of interrupts and, further, this approach cannot be used to trap target program instructions which inhibit interrupts or which change interrupt priority.

Another solution to the breakpoint return problem is to execute the trapped instruction from the breakpoint table. In this approach, the trapped instruction is executed directly out of the breakpoint table and a branch is taken to the target program instruction following the breakpoint. When this approach is used, it is necessary to simulate all trapped target program instructions whose behavior is dependent upon the state of the computer's program counter, including, e.g., subroutine call instructions and relative branch instructions. It also is necessary to distinguish among trapped target progam instructions which include multiple words. To accomplish this, an instruction length table in memory must be provided which specifies the number of words in each trapped instruction. When different trapped instructions are added to the breakpoint table, it becomes necessary to add additional simulation routines and/or to modify the instruction length table. Thus, where multiple word instructions are trapped, or where relative branch or subroutine call instructions are trapped, a substantial amount of additional programming effort is required to facilitate return from DDT to the trapped instruction of the target program.

SUMMARY OF THE INVENTION

My solution to the breakpoint return problem is the implementation, by means of sequencing and data handling circuitry of a computer, of a breakpoint return (XQT) instruction which specifies an address pointing to the first memory location of a multiple-word entry in the breakpoint table. The entry contains the address of the breakpoint and the original content of the breakpoint location before the breakpoint was inserted, i.e, the trapped instruction or its first word if it is a multiple-word instruction.

In accordance with my invention, a computer comprises sequencing logic apparatus and data handling apparatus which is so structured that when the XQT instruction is executed, the breakpoint address is read from the breakpoint table in memory and placed in the computer's program counter, the first word of the trapped instruction is read from the breakpoint table in memory and placed in the instruction register of the computer, and execution of the trapped instruction is initiated as if its first word had been obtained from its former memory location in the target program. Since the trapped instruction is executed as if its first word was obtained from its original memory location, additional words of the trapped instruction, if any, are obtained directly from their normal memory locations in the target program and there is no need to provide a reference table in memory of trapped instruction lengths. Further, there is no need for simulating trapped instructions of the relative branch or subroutine-call type.

DETAILED DESCRIPTION

Figure 1:
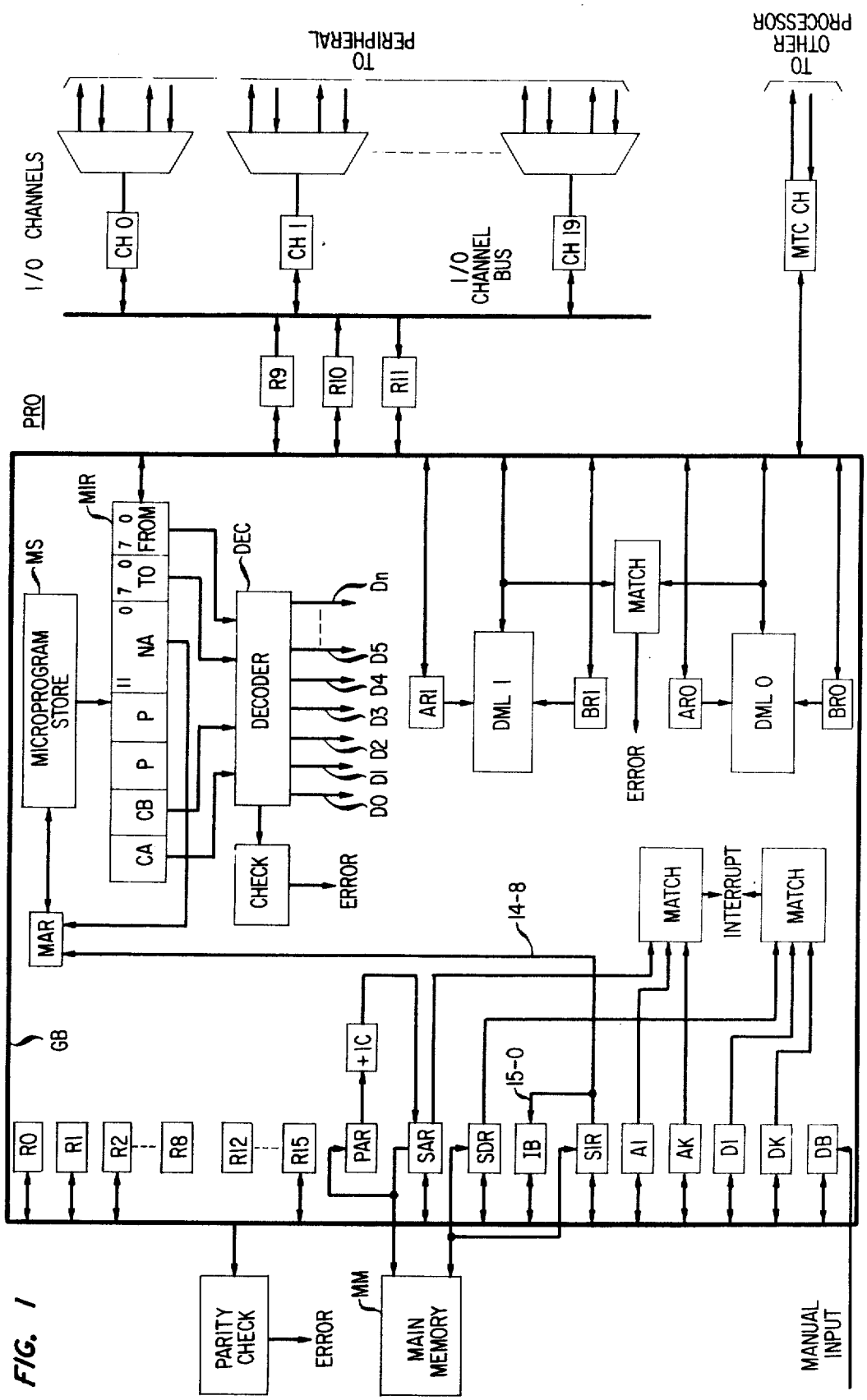
FIG. 1 is a block diagram of an illustrative computer system in which my invention is implemented.

FIG. 1 illustrates, in abbreviated block diagram form, a microprogrammable computer system for controlling an electronic communication switching system. This computer system is described in detail in an article entitled "Design of a Microprogram Control for a Processor in an Electronic Switching System" by T. F. Storey, published in the *Bell System Technical Journal*, Vol. 55, No. 2, February 1976. This Storey article is incorporated herein by reference. A brief description will be provided herein of those structural portions of the illustrative computer system necessary to understand my invention. More detailed information may be had by reference to the Storey article.

The processor PRO is comprised of a plurality of registers R0-R15, SAR, SDR, IB, SIR, A1, AK, D1, DK, DB, MIR, AR1, BR1, AR0 and BR0, all of which are connected through bidirectional gating paths to a bidirectional gating bus GB. Any of these registers can be gated via gating bus GB to any other register.

The bassic execution of an instruction by processor PRO occurs as follows:

1. The processor PRO issues a request to main memory MM and then executes a previously fetched instruction.

2. The memory request is performed and the newly fetched instruction is placed in instruction register SIR.

3. The processor PRO, upon completing the previous instruction, tests for a completion of the main memory request and for any pending interrupts.

4. If the main memory MM has not yet completed the requested memory operation, the processor PRO loops.

5. When the requested memory operation is complete and pending interrupts have been serviced, the processor PRO gates the content of register SIR into instruction buffer IB and gates a portion of the content of register SIR into the microstore address register MAR.

6. The portion of the content of register SIR gated into register MAR is the operation code field of the instruction and it points to the starting address of the sequence of microinstructions stored in microprogram store MS that will execute or interpret the function specified by that operation code.

7. One of the operations included in each microinstruction sequence defined by an operation code is to obtain the next instruction from main memory MM, thus enabling the instruction execution process to repeat itself.

Requests for operations of main memory MM are described in the Storey article in Section 4.6 thereof. Register SAR defines the address of the memory location in main memory MM to be accessed. The content of the memory location in memory MM is returned either to instruction register SIR or data register SDR as specified in a microinstruction requesting a memory read operation. When execution of an instruction is completed, an indication is provided that the information requested from memory MM is a new instruction specifying a new operation code. At this time, a check is made by processor PRO to determine if any interrupts are pending before the new operation code is gated from register SIR to register MAR. Otherwise, no check is made for pending interrupts.

The sequence control apparatus of processor PRO comprises microstore address register MAR, read-only microprogram store MS, microinstruction register MIR and decoder DEC. As noted above, a new instruction obtained from memory MM is placed in register SIR. Simultaneously, an indication is provided that the memory request has been completed. While the memory request is being acted upon, processor PRO is operating on the previously obtained instruction. At the termination of the sequence of microinstructions that constitute this instruction, all zeros are placed in the NA field of register MIR as a result of the last microinstruction in the sequence. The coincidence of field NA = 0 in register MIR, memory request complete, and no pending interrupts results in gating of the new operaton code from register SIR to register MAR.

Each time a microinstruction is read out of store MS, an address is stored in the NA field of register MIR. After being gated from register MIR to register MAR, this address points to the next microinstruction in that sequence. Thus, loading an operation code into register MAR initiates execution of a sequence of microinstructions designed to perform the functions specified by that operation code. The last microinstruction of that sequence contains all zeros in its NA field. Consequently, a new operation code is loaded into register MAR and the process is repeated.

As illustrated by the organization of microinstruction register MIR, as shown in FIG. 1, the basic microinstruction format for processor PRO is a 32-bit word which includes an 8-bit FROM field, an 8-bit TO field, a 12-bit NA field, two parity bits, a CB bit and a CA bit. The Storey article describes a number of ways in which these fields are employed to control operations of processor PRO. For purposes of this description, the FROM field defines a destination register to which the content of a source register defined by the TO field is gated; the NA field defines the address of the next microinstruction in the microinstruction sequence being executed; and the CA and CB bit define various control functions including initiation of a request for obtaining a new instruction or word thereof from main memory MM.

Decoder DEC is connected to the various information fields of register MIR and decodes the content of these fields of the microinstruction stored in register MIR. Decoder DEC provides output control signals D0-Dn, selectively, in accordance with the decoded content of register MIR. These control signals activate the gating paths and additional control functions called for by the microinstruction in register MIR.

The program address register PAR, plus one counter +1C, and store address register SAR serve as a program counter arrangement controlled by output signals from decoder DEC to sequence through addresses defining consecutive memory locations in main memory MM. When a microinstruction calls for incrementing the program address register PAR, 1 is added to the content of register PAR by counter +1C and the result is gated into register SAR. The resulting content of register SAR is then gated back into register PAR, thereby causing the content of register PAR to be incremented by one. This operation can be controlled by the state of the CA and CB bits of the microinstruction stored in register MIR, resulting in an output control signal from decoder DEC on its output DO. Gating between registers SAR and PAR also can be otherwise controlled during execution of other microinstructions.

Figure 3:
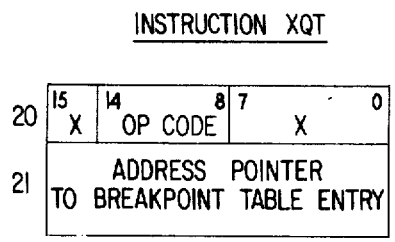
FIG. 3 illustrates the format of a breakpoint return (XQT) instruction as stored in the memory of a computer system.
Figure 4:
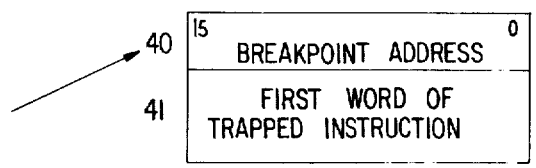
FIG. 4 illustrates the format of one multiple-word entry of a breakpoint table stored in the memory of a computer system.
Figure 5:
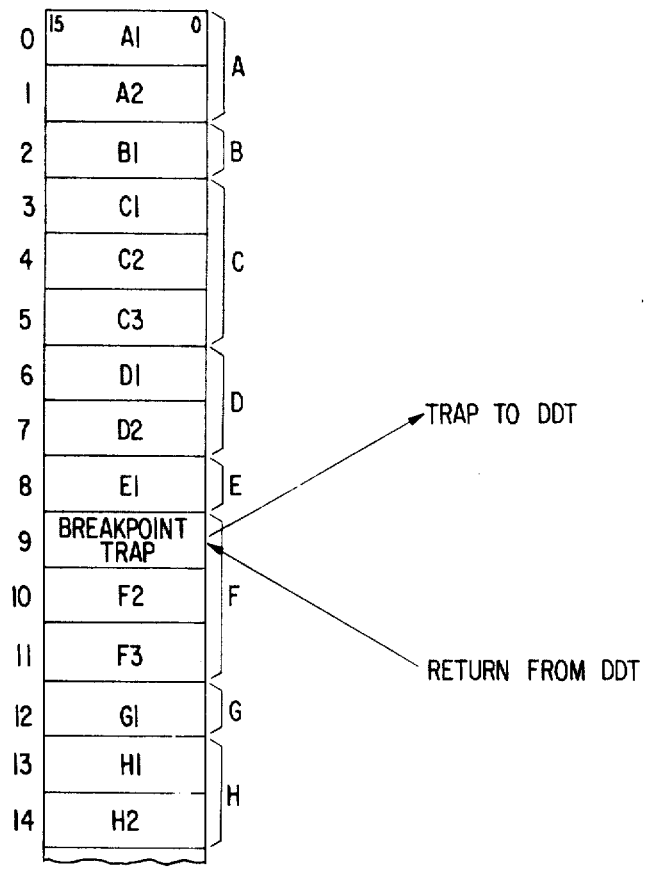
FIG. 5 illustrates a target program having a breakpoint trap instruction entered therein as stored in the memory of a computer system.

FIGS. 3-5 illustrate the format of portions of the information stored in main memory MM. FIG. 5 represents a portion of a target program comprising instructions A, B, C, D, E, F, G and H stored in memory locations 0-14 of memory MM. These instructions A-H contain varying numbers of words. For example, instruction A includes two words, instruction B is a single word, and instruction C includes three words. A single word breakpoint trap instruction has been inserted at memory location 9 in place of the first word F1 of the three-word instruction F, thus making instruction F a trapped instruction. As is well known in the art, when the breakpoint trap instruction at location 9 is encountered, control of the processor executing the trap instruction will be transferred to DDT. For purposes of this description, it is assumed that this transfer of control has occurred.

FIG. 4 represents one entry of a breakpoint table which has been stored in memory MM at memory locations 40 and 41. The first word of this entry at memory location 40 specifies the address of memory location 9 at which the breakpoint trap instruction has been inserted in the target program. The second word of the breakpoint table entry at memory location 41 contains the first word F1 of instruction F which has been replaced in the target program by the breakpoint trap instruction at memory location 9.

FIG. 3 illustrates the format of a two-word breakpoint return instruction XQT stored at memory locations 20 and 21 as a part of a DDT monitor program. This instruction is obtained from memory MM in response to a command from the user to return computer control to the target program. The first word of instruction XQT at memory location 20 specifies, in bits 8-14 thereof, the operation code of instruction XQT. The second word of instruction XQT at memory location 21 specifies the address of memory location 40 at which the beginning of the breakpoint table entry is stored.

It is assumed that the user of the DDT monitor program has issued a command responsive to which processor PRO has initiated a request to obtain instruction XQT from memory MM. It is further assumed that the NA field of the microinstruction in register MIR includes all zeros, thereby indicating the end of the microinstruction sequence for the instruction currently being executed in processor PRO. It also is assumed that the memory operation to obtain instruction XQT has been completed successfully, as described in Section 4.7 of the Storey article, and that the first word of instruction XQT has been obtained from memory location 20 and presently is stored in register SIR. At this time, registers PAR and SAR both contain the address of memory location 20 from which the first word of instruction XQT was obtained.

Figure 2:
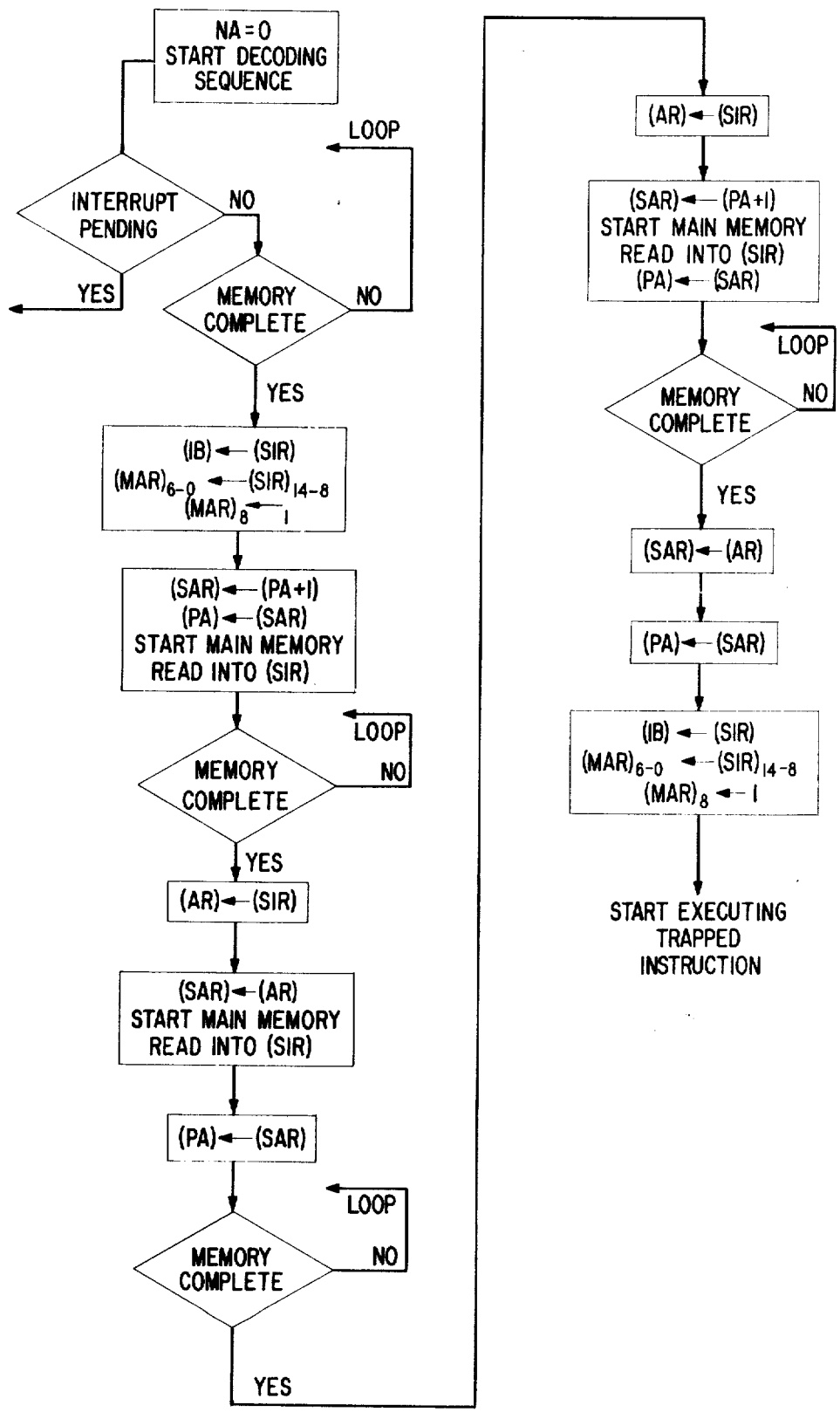
FIG. 2 is a flow chart illustrating part of the structure of computer logic in the computer system of FIG. 1.

FIG. 2 is a flow chart illustrating the structure and sequencing of logical elements in processor PRO during its execution of instruction XQT. Since the illustrative processor PRO is a microprogrammed computer, the sequencing control logic for controlling the execution of instruction XQT by elements of processor PRO is structured by means of microinstructions stored in the read-only microstore MS. Equivalent wired sequence cntrol logic for providing identical sequence control signals to implement corresponding logical functions in a non-microprogrammed computer is considered to be identical in concept and well within the design capability of one skilled in the art.

Referring now to FIG. 2 under the initial conditions described above (including NA=0 in register MIR), processor PRO first examines its internal state to detect any pending interrupts and services any interrupts detected. If no interrupts are detected, processor PRO checks to determine that the previously requested operation of memory MM to obtain instruction XQT has been successfully completed. If the memory operation is incomplete, processor PRO loops through no-operation microinstructions until a memory complete indication is detected.

When a memory complete indication is detected, the content of register SIR is gated directly into register IB, thereby placing the first word of instruction XQT in register IB; the content of bit positions 8-14 of register SIR is gated directly to bit positions 0-6 of register MAR, thereby storing the operation code portion of instruction XQT in register MAR; and bit position 8 of register MAR is set to a "1" state. All of the above operations are described in the aforenoted Storey article at Section 5.1 thereof.

The XQT instruction's operation code in bit positions 0-6 of register MAR defines the address of the first microinstruction in the sequence of microinstructions to be used to execute instruction XQT. As a result, the first microinstruction of the sequence is read from microprogram store MS and is stored in register MIR. The CA and CB bits of this first microinstruction cause decoder DEC to generate a control signal DO. The signal DO causes the incremented content of register PAR to be gated from counter +1C to register SAR, thereby adjusting the content of register SAR to identify the address of memory location 21 at which the second word of instruction XQT is stored. The signal DO also initiates a request to obtain the content of the memory location 21 whose address is now specified in register SAR and to store the information thus obtained in register SIR. Also in response to the control signal DO, the incremented content of register SAR is gated to register PAR. A more detailed discussion of operations involving this type of communication with memory MM is presented in the Storey article at Section 4.6 thereof.

Processor PRO then checks to determine whether the requested memory operation has been completed. Since the NA field of register MIR does not now contain all zeros, no check for pending interrupts is made by processor PRO.

When processor PRO determines that the requested memory operation is completed, the second word of instruction XQT will have been obtained from memory location 21 and placed in register SIR. Thus, register SIR now contains the address which identifies memory location 40 at which the first word of the breakpoint table entry is stored.

Upon detecting the completion of the requested memory operation, the second microinstruction of the XQT sequence has been obtained from store MS at the address identified in the NA field of the first microinstruction and is stored in register MIR. The TO and FROM fields of this second microinstruction cause decoder DEC to generate control signal D1. This control signal D1 causes the content of register SIR to be gated via gating bus GB to registers AR0 and AR1, thereby placing in these registers the address of memory location 40 at which the first word of the breakpoint table entry is stored.

The third microinstruction obtained from store MS at the address defined by the NA field of the second microinstruction and stored in register MIR causes decoder DEC to concurrently generate control signals D2 and D3. Control signal D2 causes the content of register AR0 and AR1, which are identical, to be gated via gating bus GB to register SAR, thereby placing therein the address of memory location 40 at which the first word of the breakpoint table entry is stored. The control signal D3 initiates a request for a memory operation to read memory location 40, as defined by the address stored in register SAR, and to return the content of that memory location to register SIR. When this memory operation is complete, the address of the memory location 9, at which the breakpoint trap instruction was inserted, will have been obtained from memory location 40 and stored in register SIR.

Pending completion of the requested memory operation, the fourth microinstruction of the XQT sequence is read from store MS at the memory location defined by the NA field of the third microinstruction and is stored in register MIR. In accordance with the TO and FROM fields of this microinstruction, decoder DEC provides a control signal D4. Control signal D4 causes the content of register SAR to be gated directly to register PAR. The resulting content of register PAR defines the address of the first memory location 40 of the breakpoint table entry.

Processor PRO now checks its state to determine when the requested memory operation is completed. Upon completion of the memory operation, the fifth microinstruction of the XQT sequence has been obtained from store MS at the address defined by the NA field of the fourth microinstruction and is stored in register MIR. The fifth microinstruction causes decoder DEC to provide control signal D1. Control signal D1 causes the content of register SIR to be gated via gating bus GB to registers AR0 and AR1, resulting in registers AR0 and AR1 containing the address of memory location 9 at which the breakpoint trap instruction was inserted in the target program.

The sixth microinstruction is obtained from store MS at the address defined in the NA field of the fifth microinstruction and is stored in register MIR. The Ca and CB bits of this microinstruction are decoded by decoder DEC, resulting in a control signal D0. As described above, control signal D0 causes the incremented content of register PAR to be gated from counter +1C to register SAR; the initiation of a request to read memory MM at the location defined by the resulting content of register SAR; and the gating of the resulting content of register SAR to register PAR. As a result, the content of register SAR defines the address of memory location 41 in which the first word F1 of the trapped instruction F is stored. Thus, upon completion of the requested memory operation, register SIR will contain the first word F1 of the trapped instruction F.

Processor PRO now checks for completion of the requested memory operation. When the memory operation indicates its completion, the seventh microinstruction of the XQT sequence has been read from store MS at the address defined in the NA field of the sixth microinstruction and is stored in register MIR. The TO and FROM fields of register MIR are decoded by decoder DEC which produces control signal D2. Control signal D2 causes the content of registers AR0 and AR1, which are identical, to be gated via gating bus GB to register SAR. This results in the placement in register SAR of the address of memory location 9 at which the breakpoint trap instruction was inserted in the target program.

The eighth microinstruction is obtained from store MS at the address defined in the NA field of the seventh microinstruction and is stored in register MIR. The TO and FROM fields of the eighth microinstruction are decoded by decoder DEC resulting in a control signal D4. As described earlier, control signal D4 causes the content of register SAR to be gated directly to register PAR. As a result, both registers PAR and SAR now contain the address of memory location 9 at which the breakpoint trap instruction was inserted in the target program.

The ninth and last microinstruction of the XQT sequence is obtained from store MS at the address defined by the NA field of the eighth microinstruction and is stored in register MIR. The last microinstruction is decoded by decoder DEC, resulting in a control signal D5. Control signal D5 causes the content of register SIR to be gated directly to register IB, the content of bit positions 8–14 of register SIR to be gated directly to bit positions 0–6 of register MAR; and bit position 8 of register MAR to be set to its "1" state. As a result, registers SIR and IB contain the first word F1 of the trapped instruction F and register MAR contains the operation code portion of the first word F1 of the trapped instruction F. These operations are almost identical to those performed in loading a new operation code into register MAR from register SIR. They occur as if instruction F had been obtained from location 9 in memory MM, except that no check for a completed memory operation is made, and except that no checks for pending interrupts are performed by processor PRO since the NA field of the last microinstruction was not all zeros.

Processor PRO now proceeds to execute instruction F as if its first word F1 had been obtained from memory location 9 in the target program rather than from memory location 41 in the breakpoint table entry. The operation code of instruction F stored in register MAR defines the address in store MS of the first microinstruction in the sequence of microinstructions associated with the execution of instruction F. The additional instruction words F2 and F3 of instruction F will be obtained from their respective memory locations 10 and 11 in memory MM when needed in the course of executing instruction F, and processor PRO will proceed in a normal manner to execute instructions G, H, etc. of the target program.

The structural organization of computer sequencing and data handling logic disclosed herein facilitates the return of control from an on-line debugging program DDT to a target program breakpoint without requiring either a temporary removal of the breakpoint or a deferral of interrupts. The computer operations will not be disrupted in the event that the trapped instruction inhibits interrupts or changes the priority of interrupts. There is no need for a table to be established in memory specifying the number of words in each trapped instruction. There is no need for simulation in the debugging program of trapped instructions of the relative branch or subroutine call class. Further, the target program can be resident in read-only memory since there is no need to remove or replace the breakpoint trap in the course of returning control to the target program.

My invention can be implemented in processors arranged to adjust the program counter at different stages during execution of an instruction to define the address of the next instruction. Further, my invention can be implemented in processors where a trapped instruction is not removed from the target program but the trap is executed as an interrupt when a particular memory location is addressed by the processor. The breakpoint address stored in memory may not directly identify the location at which the breakpoint is placed in the target program. It can be arranged to uniquely identify directly or indirectly the next sequential memory location. In the event that the trapped instruction includes a transfer address to which a transfer may be made following execution of the trapped instruction, the breakpoint address may not be used as the basis for obtaining the next instruction to be executed. Rather, the program counter arrangement will be adjusted to address the memory location defined in the trapped instruction.

It is to be understood that the above-described arrangements are merely illustrative of an application of the principles of my invention. Numerous other arrangements may be devised by others skilled in the art without departing from the spirit and scope of my invention.

What is claimed is:

1. In an instruction executing computer system having memory means for storing information including a target program of instructions and a debugging program of instructions, a trap instruction having been inserted at a breakpoint location in said target program in place of one word of a selected instruction thereof to transfer control therefrom to said debugging program, said one word and its original address in said target program having been stored elsewhere in said memory means, and said debugging program including a return instruction; an arrangement for returning control of said system from said debugging program to said target program comprising:

a plurality of registers;

sequence control means coupled to the one of said registers containing an instruction to be executed for selectivey generating a sequence of control signals to control the performance of the set of functions defined by said instruction to be executed;

program counter means coupled to said memory means for specifying the location in said memory means from which said information is to be retrieved;

retrieval means connected between said memory means and some of said registers, including said one of said registers, and operative in response to certain of said control signals generated by said sequence control means for transferring said information from said location in said memory means specified by said program counter means to at least said one of said registers; and gating path means intercoupling said plurality of registers and said program counter means and operative in response to others of said control signals for selectively transferring the contents of said plurality of registers among them and to said program counter means;

said sequence control means first operating in response to completion of the performance of the preceding said set of functions, including transfer of said return instruction to said one of said registers, to generate a first sequence of control signals to control performance of the particular set of functions defined by said return instruction, said particular set of functions including operation of said retrieval means and said gating path means to transfer said original address to said program counter means from said memory means and to transfer said one word to said one of said registers from said memory means, and thereafter operating in response to said first sequence of control signals, without first transferring any information from said memory means, to immediately generate a second sequence of control signals to control performance of the set of functions defined by said selected instruction.

2. The arrangement in accordance with claim 1 wherein said sequence control means includes:

means for generating a predetermined signal in each of said sequence of control signals to indicate the completion of performance of the set of functions defined by any said instruction to be executed other than said return instruction and for omitting the generation of said predetermined signal from said first sequence of control signals that control the performance of said particular set of functions defined by said return instruction.

3. The arrangement in accordance with claim 2 wherein said control signals are specified by a sequence of micro-instructions executed to perform said set of functions defined by said instruction to be executed, said sequence control means further comprising:

an address register coupled to at least said one of said registers to receive a transfer of at least a portion of said instruction to be executed either in response to said predetermined signal in said each said sequence of control signals or to a control signal in said first sequence of control signals that control the performance of said particular set of functions defined by said return instruction;

micro-program store means coupled to said address register for storing a plurality of micro-instructions each having a next-address portion and operative to read out one of said micro-instructions from the location in said store means whose address is designated by the contents of said address register;

a micro-control instruction register coupled to said store means to receive said one of said micro-instructions read out from said store means and coupled to said address register to transfer thereto the next-address portion of said one of said micro-instructions to thereby designate the address in said store means of the next mirco-instruction to be executed; and means coupled to said micro-control instruction register for decoding said one of said micro-instructions to derive some control signals of said sequence of control signals and coupled to said retrieval means and said gating path means to signal them respectively upon derivation of said certain of said control signals and said others of said control signals.

4. The arrangement in accordance with claim 1 wherein said memory means comprises read-only memory means having said target program and said trap instruction stored therein and other memory means having said debugging program stored therein.

5. The method of returning control of a computer system to a program wherein one word of a selected multi-word instruction in said program has been replaced with a transfer instruction, said one word and its original address having been saved in memory means of said system;

the method comprising the following steps:
1. retrieving said one word and its original address from said memory means and storing them, respectively, in the instruction register and program counter of said computer system, and
2. without further retrieval of information from said memory means, immediately initiating execution of said selected instruction.

6. The method of returning control of a computer system from a testing program stored in memory means of said computer system to a target program also stored in said memory means and in which a single word breakpoint trap instruction has been inserted in place of the first word of another instruction of said target program, said replaced first word of said other instruction and the address of said breakpoint trap instruction having been stored elsewhere in said memory means;

the method comprising the following steps:
1. retrieving said replaced first word of said other instruction and said address of said breakpoint trap instruction from said memory means and storing them, respectively, in instruction register means and program counter means of said computer system, and
2. without further retrieval of information from said memory means, immediately initiating execution of said other instruction.

7. The method of claim 6 wherein said step 1 comprises the following steps:
a. adjusting said program counter means to specify the address of the location in said memory means in which said address of said breakpoint trap instruction is stored in accordance with address information specified by a return instruction previously stored in said instruction register means;
b. retrieving said address of said breakpoint trap instruction from the location in said memory means whose address is specified by said program counter means and storing said address of said breakpoint trap instruction in a first register of said computer system;
c. readjusting said program counter means to specify the address of the location in said memory means in which said first word of said other instruction is stored;
d. retrieving said first word of said other instruction from the location in said memory means whose address is specified by said program counter means and storing said first word of said other instruction in said instruction register means; and
e. gating said address of said breakpoint trap instruction from said first register to said program counter means.

* * * * *